(No Model.) 4 Sheets—Sheet 1.
A. H. SUTTON & P. H. WATSON.
R. R. WATSON, Executrix of P. H. WATSON, Dec'd.
MACHINE FOR MEASURING TEXTILE FABRICS, &c.
No. 359,579. Patented Mar. 15, 1887.
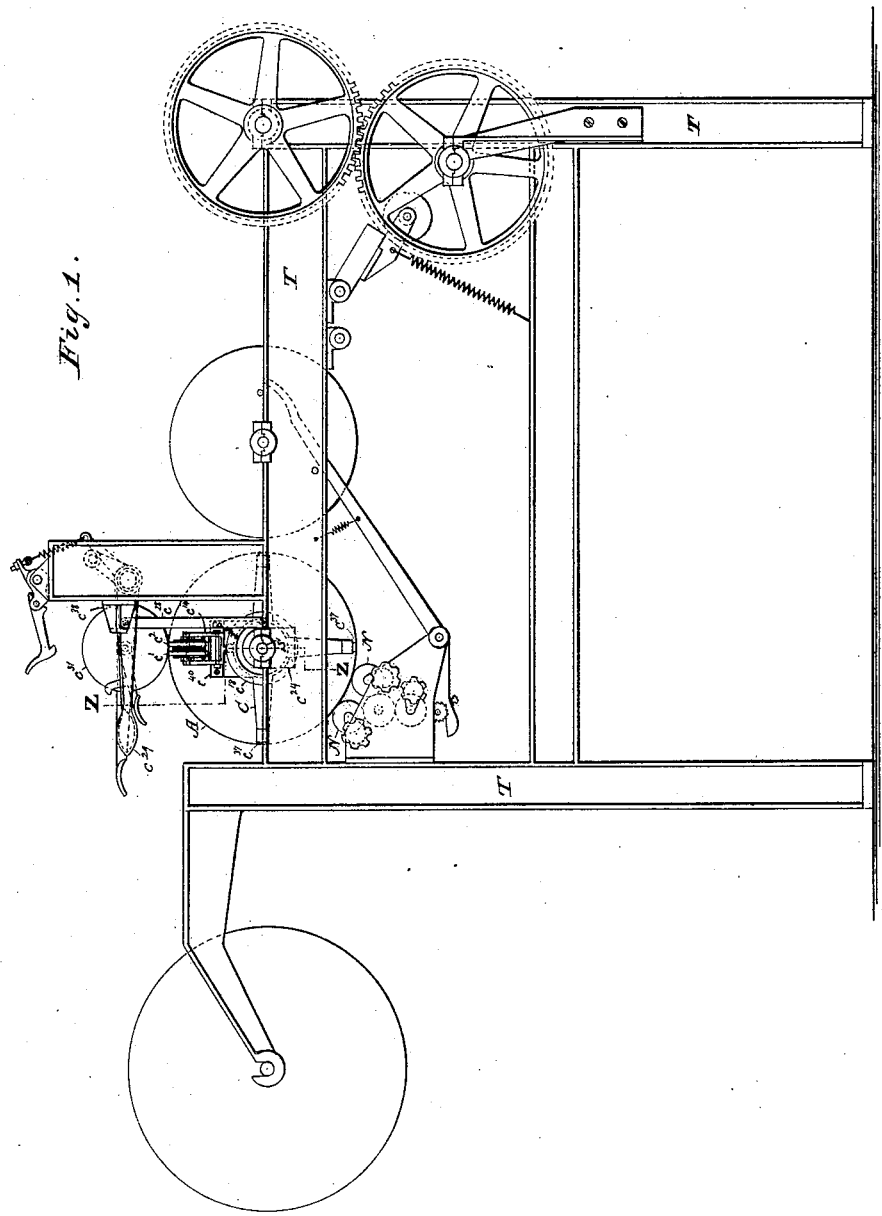
WITNESSES:
L. C. Hills
W. B. Masson
INVENTORS
Andrew H. Sutton
and Peter H. Watson
BY
E. E. Masson
ATTORNEY (No Model.) 4 Sheets—Sheet 2.
A. H. SUTTON & P. H. WATSON.
R. R. WATSON, Executrix of P. H. WATSON, Dec'd.
MACHINE FOR MEASURING TEXTILE FABRICS, &c.
No. 359,579. Patented Mar. 15, 1887.
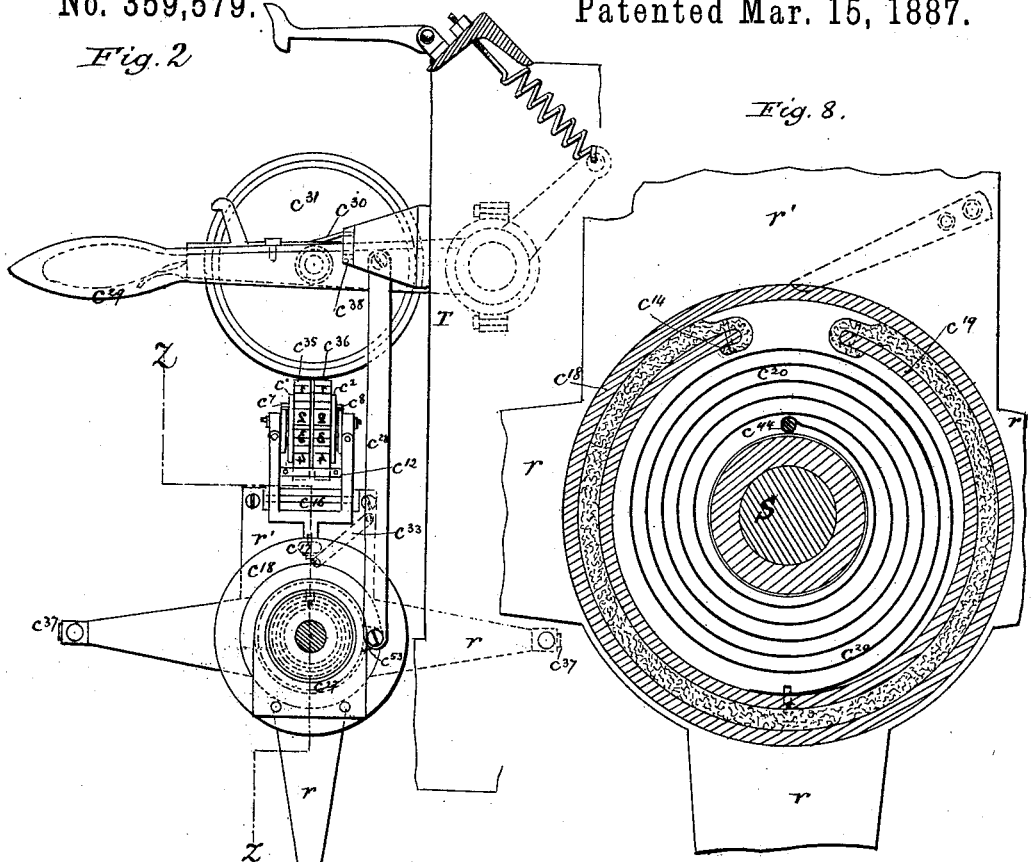
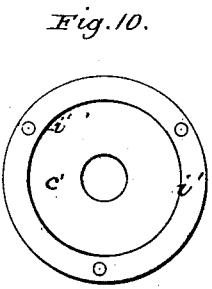
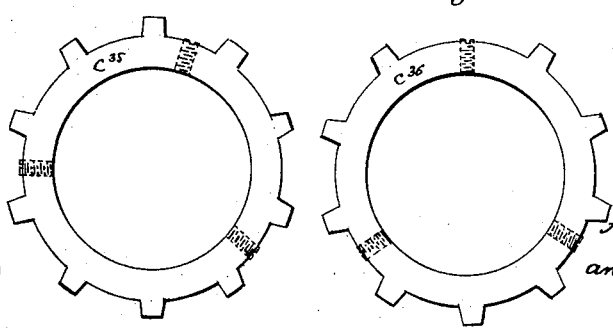
Witnesses:
L. L. Hills
W. B. Masson
Inventors
Andrew H. Sutton
and Peter H. Watson
by E. E. Masson
atty.

(No Model.) 4 Sheets—Sheet 3.
A. H. SUTTON & P. H. WATSON.
R. R. WATSON, Executrix of P. H. WATSON, Dec'd.
MACHINE FOR MEASURING TEXTILE FABRICS, &c.
No. 359,579. Patented Mar. 15, 1887.
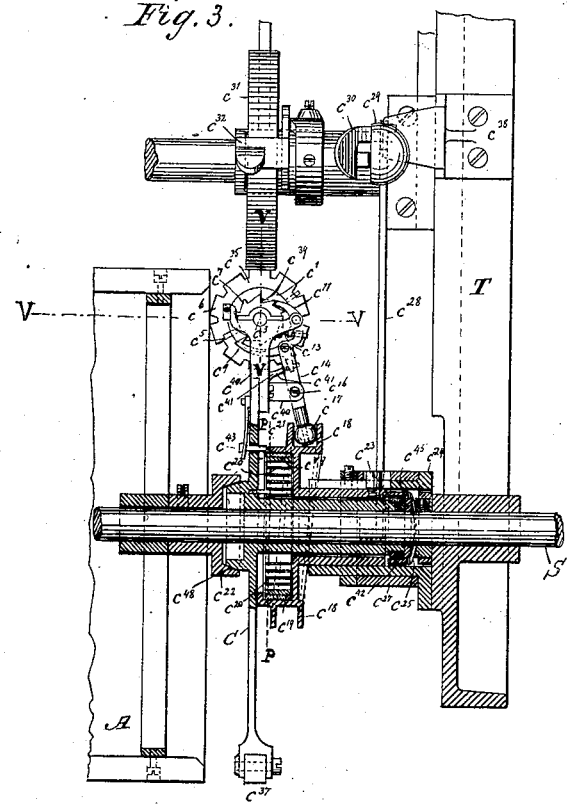
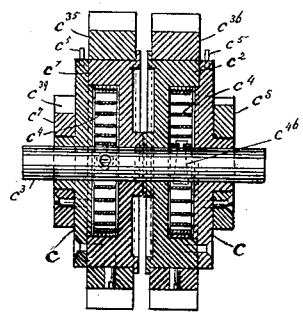
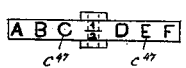
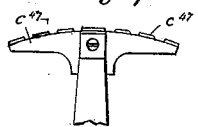
WITNESSES:
L. C. Hills
W. B. Masson
INVENTORS
Andrew H. Sutton,
and Peter H. Watson.
BY E. E. Masson
ATTORNEY (No Model.) 4 Sheets—Sheet 4.

A. H. SUTTON & P. H. WATSON.
R. R. WATSON, Executrix of P. H. WATSON, Dec'd.
MACHINE FOR MEASURING TEXTILE FABRICS, &c.

No. 359,579. Patented Mar. 15, 1887.

Witnesses:
D. C. Hills
W. B. Masson

Inventors:
Andrew H. Sutton,
and Peter H. Watson
by E. E. Masson
atty.

N. PETERS, Photo-Lithographer, Washington, D. C.

United States Patent Office.

ANDREW H. SUTTON AND PETER H. WATSON, OF NEW YORK, N. Y., SAID SUTTON ASSIGNOR TO SAID WATSON; ROSELLE REBECCA WATSON EXECUTRIX OF SAID PETER H. WATSON, DECEASED.

MACHINE FOR MEASURING TEXTILE FABRICS, &c.

SPECIFICATION forming part of Letters Patent No. 359,579, dated March 15, 1887.

Application filed July 30, 1883. Serial No. 102,350. (No model.)

*To all whom it may concern:*

Be it known that we, ANDREW H. SUTTON and PETER H. WATSON, citizens of the United States, residing at the city of New York, in the county of New York and State of New York, have invented certain new and useful Improvements in Machinery for Measuring Textile Fabrics, Registering the Measure Thereon, and Indicating the Measurement, of which the following is a specification, the accompanying drawings making part thereof, the same letters of reference with their exponents (when they have any) referring to the same parts of the mechanism throughout these drawings.

Figure 15:
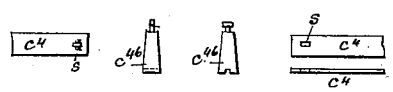
Figure 16:
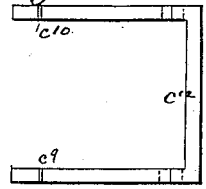
Figure 17:
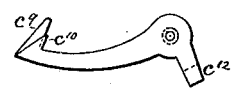
Figure 18:
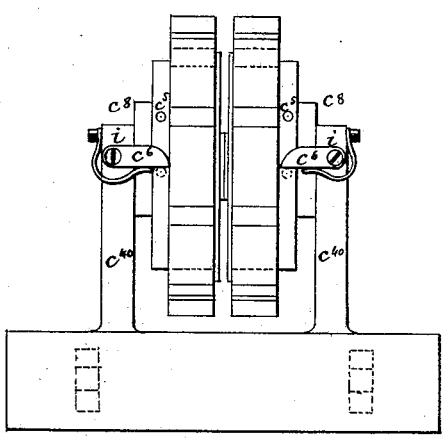
Figure 19:
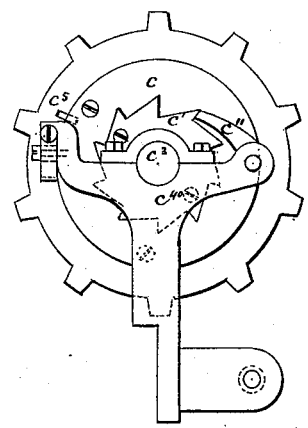
Figure 20:
Figure 21:
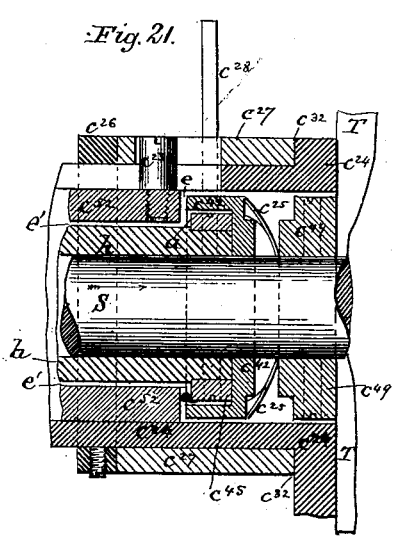
Figure 22:
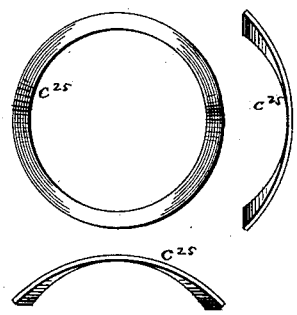

Figure 1 represents a side elevation of a frame and portion of our machine. Fig. 2 represents a detached view, upon an enlarged scale, of the registering mechanism shown in Fig. 1. Fig. 3 represents a section through the meandering dotted line Z Z, Fig. 2. Fig. 4 represents a section through the dotted line V V of Fig. 3, enlarged to show details of the type-wheels. Fig. 5 is a diagram of a part of the registering mechanism, to show the means for turning the integer-wheels and bringing their several types consecutively into position for printing and holding them steady while making their respective marks upon the cloth. Fig. 6 shows in plan a device for imprinting an identifying or other mark upon the cloth, in this instance in connection with one of the symbols of fractional measurement. Fig. 7 is a view in elevation of the parts shown in Fig. 6. Fig. 8 is a section at the line P P, Fig. 3, of the annular cam, which, through a lever and pawls, (shown in Figs. 2, 3, 5,) actuates the type-wheels, showing its spring-box, spring friction-rubber, and the retractor-spring for returning the type carrier or disk to its zero position, which at one end is connected with the spring-rubber and at the other end with the type-carrier. Fig. 9 shows one of the type wheels with its ring of integer-types, the cover of its spring-box being removed to show the retractive friction-spring with a rubber formed on it to produce the requisite friction to steady the types and return them to the zero position when the registry of one piece of cloth is finished preparatory to beginning the registry of another piece. Fig. 10 is a side view of the spring-box with its cap and spring removed. Fig. 11 represents a view in which the spring has a piece of felt, brass, or other suitable substance to form a brake-shoe, attached near its outer end, to form a rubber to bear against the surface of the wheel and produce friction. Fig. 12 represents a side view of the inside of the cap of the spring-box detached, with a seat formed on its hub for the ratchet-weeel. Fig. 13 is a side elevation of one of the rings on which the types for the units of the integer figures of the registry-numbers are formed, the ring being removed from the wheel to which it is fitted, and is to be held in place by set-screws, as shown in Fig. 4. Fig. 14 is a like view of the ring on which the types for the tens integer figures of the registry - numbers are formed. Fig. 15 is a view of the details of the conical pin for fastening one end of the steadying friction and retractor spring to the shaft, on which the type-wheel turns freely, the other end of the spring being connected to this wheel by the friction of contact and pressure against the surface of the wheel. Fig. 16 is a plan of a double driving-pawl for the units ratchet-wheel and for the tens ratchet-wheel. Fig. 17 is a side elevation of the double pawl shown in Fig. 16. Fig. 18 is a front elevation of the type-wheels with the bracket in which they are mounted, showing more fully the hinged zero-pawls and the zero-pins of these wheels. Fig. 19 is a side elevation of the parts shown in Fig. 18. Fig. 20 is a top view of the rocking-cam collar of the printing-movement. Fig. 21 is a vertical section, upon an enlarged scale, of a part of the outer portions of the printing mechanism mounted upon the shaft of the cylinder and on the frame, shown in the same sectional view upon a smaller scale in Fig. 3. Fig. 22 shows a plan and two edge elevations of the clutch-spring.

To overcome defects of other machines is one object of our invention, and to this end we have so contrived our graduating and printing mechanism that the notation-marks shall be made on the fabric with small printing-wheels of little weight, each carrying ten type-symbols—*i. e.*, the nine digits and cipher—which wheels on being released after printing a web, however long and requiring however many turns, will by less than one full turn of either wheel, averaging less than one-half of a full turn, be carried back by an easy movement, without inconvenient velocity or dangerous momentum, to the zero position, ready to begin another registry of measurement. Thus after the registry of a piece of nine hundred and ninety-nine yards an automatic movement so slight as merely the turning back of fifteen types through the space of about three and one-half inches, occupying but an instant of time and requiring a force of but a few ounces, will place the type-wheels in position ready to begin the registry of another piece.

In our improved arrangement the type-carrier consists of a disk, C, having a long hub, $h$, mounted loosely on the shaft S, Figs. 1, 2, 3, and passed through the sleeve $c^{52}$, leaving a space, $e'$, Fig. 21, between them. It has also four radial arms, $r$ $r$ $r$, three of which carry types $c^{37}$ to print the fractions, while the fourth, $r'$, carries in a bracket, $c^{40}$, the type-wheels $c'$ $c^2$, with their types, to print the integers of the measurement. This disk C is held in its several positions by friction, produced by pressing concave and convex surfaces $c^{22}$ $c^{48}$ together with force enough to produce the requisite adhesion. When such pressure is released the friction-surfaces of the clutch will separate, and the disk then will have its arms with their respective types turned back to the zero position by the retractive action of the spring $c^{20}$, attached at one end, by frictional contact through a spring-rubber, $c^{19}$, to the disk, and at the other end, by a stud, $c^{44}$, to a suitable brake-surface on a convenient fixed part of the machine—in the example shown in the drawings, the fixed cam $c^{18}$.

The disk C, mounted, as described, to turn freely upon the shaft of the measuring-cylinder, carries one of the surfaces, $c^{48}$, of the friction-clutch—in this case the convex—the other, a concave surface, $c^{22}$, being in this instance formed on a collar secured to the shaft of the measuring-cylinder. By this device the registering mechanism derives its motion from and therefore conforms its velocity to that of the measuring-cylinder A.

The faces of the types mounted on the arms $r$ of the disk C, when in position for printing, are at the same radial distance from the center of the cylinder-shaft as the surface of the measuring-cylinder A, the types being carried round and applied to the fabric at the proper intervals for registry of the measure by the disk C, driven by the separable clutch $c^{22}$ $c^{48}$ upon the shaft of the measuring-cylinder, while the process of measuring a piece of goods is going on; but when the measurement of a piece is concluded, the driving-contact of the convex surface $c^{48}$ of the disk C with the clutch $c^{22}$ is broken, and the arms with their types return to the zero-point by the retractive action of the spring $c^{20}$.

The arms $r$ are provided at their ends with sockets to secure types $c^{37}$, to denote fractions, as ¼, ½, ¾, either with or without an identifying symbol, such as that shown at $c^{47}$, Figs. 6, 7, or such marks may be substituted for the fractions. When desirable, the fraction and identifying types, or either of them, may be omitted.

The types for marking the integers are arranged, as shown in the drawings, to measure from one to one hundred, upon two small wheels, $c'$ $c^2$, Figs. 1, 2, 3, 4, 13, 14, the unit-wheel having numeral types from 0 to 9, Fig. 13, both inclusive.

If it is required to measure and register numbers from one to one thousand, a third type-wheel must be added.

The integer type-wheels $c'$ $c^2$ in the two-wheel arrangement are fitted to turn freely upon a fixed shaft, $c^3$, Figs. 3, 4, 5, 19, and the unit-wheel $c'$ is caused to revolve by means of a ratchet-wheel, $c^7$, Figs. 2, 3, 4, 5, firmly attached to the type-wheel and actuated by a driving-pawl, $c^9$, Figs. 3, 5, 17, and retained in position by a retaining-pawl, $c^{11}$. (Best shown in Figs. 3, 5.) The decimal-tooth $c^{39}$, Figs. 3, 5, of this ratchet-wheel, to represent the tens or decimal numbers, is cut deeper than the other nine teeth, 1 to 9, so that when the driving-pawl $c^9$ acts therein it falls under the action of the spring $c^{13}$, Figs. 3, 5, nearer to the shaft than when acting in the shallower teeth. The other or tens type-wheel, $c^2$, is furnished with a ratchet, $c^8$, having all its teeth shallow and of equal depth, a driving-pawl, $c^{10}$, and retaining-pawl $c^{11}$, similar to those of the wheel $c'$; but this driving-pawl $c^{10}$ is rigidly connected to the driving-pawl $c^9$ of the other ratchet by a cross-bar, $c^{12}$, Figs. 2, 3, 5, in such a position that it will not approach near enough to the shaft $c^3$ to engage with and act upon its ratchet $c^8$, but shall be held a little above it, except when the tooth of the driving-pawl $c^9$ of the units-wheel at the completion of a revolution of the latter engages with the decimal-tooth $c^{39}$ of its ratchet $c^7$, when the driving-pawl $c^{10}$ will engage with the ratchet $c^8$ of the tens-wheel and turn it forward one tooth, to bring into position for printing a type one number higher. Then, when the pawl $c^9$ at the next moment rises from the decimal-tooth of its ratchet into the shallow teeth, it will, through the cross-bar $c^{12}$, raise the pawl $c^{10}$ to disengage it from its ratchet and hold it up until the unit type-wheel has completed another revolution and again drops its pawl into the decimal-tooth of its ratchet. Thus it requires one revolution of the ratchet $c^7$ of the unit-wheel to move the ratchet $c^8$ one tooth and ten complete revolutions of the ratchet $c^7$ to give one revolution of the ratchet $c^8$ of the tens-wheel, making the type-wheels $c'$ $c^2$, by their combined movement, print the numbers in regular and continuous order and succession from 1 to 99, as aforesaid, or show any of those numbers to the eye of the attendant in case ink is not used.

The bracket-frame $c^{40}$, the type-wheel shaft $c^3$, and cross-bar $c^{12}$ of the driving-pawl may be lengthened, and a third type-wheel be made like the units-wheel, but with its decimal-tooth of its ratchet one-half deeper. This additional unit-wheel should be placed on the shaft $c^3$ before the units-wheel $c'$, and also like that wheel should be provided with integer type, a ratchet-wheel, a retaining-pawl, a zero-pawl, and a driving-pawl, the latter attached to the cross-bar $c^{12}$, like the driving-pawls of the other type-wheels, and opposite to its own proper ratchet.

The three-wheel arrangement will print all integer numbers consecutively from 1 to 999, the first nine integers having a cipher prefixed, as 01, 02, to 09. Then 10 is printed, and from this the numbers go on in regular order of expression and succession to the terminal number 999.

The shaft $c^3$ of the type-wheels is carried by a bracket, $c^{40}$, Figs. 3, 5, 18, 19, secured to one of the arms, $r'$, of the disk C, and revolves therewith. This bracket $c^{40}$ also furnishes the necessary base for supporting the retaining-pawls $c^{11}$ $c^{11}$ and their springs.

The type-wheels $c'$ $c^2$ are fitted with type cut or arranged upon rings $c^{35}$ $c^{36}$, Figs. 2, 3, 4, 13, 14, which are secured to their respective wheels by set-screws, Figs. 4, 13, so that they may be removed and others substituted when it is desired to change the size or character of the types. Within each wheel $c'$ $c^2$ is a recess in which is placed a friction rubber brake or drag and retractor-spring, $c^4$, to accumulate and give out tensile force, as required. This spring in its general form is similar to that of the mainspring of a watch. One end of the spring is fastened to the stationary shaft $c^3$ by means of a conical pin, $c^{16}$, Figs. 4, 15, said conical pin having at its smaller end a cross-bar or button adapted to pass lengthwise through a slot, $s$, Fig. 15, near the end of the spring and then turned across the slot, to secure the end of the spring to the shaft. Upon the outer end of each spring $c^4$ may be secured a piece of felt, $m$, Fig. 11, thin sheet-brass, or other suitable friction-producing substance, to act as a friction rubber or drag, which rubber, being held by the pressure of the spring itself against the adjacent rub-surfaces $i'$ of the recess, will, by the revolution of the type-wheel, through the action of the ratchet and driving-pawls, wind up the spring $c^4$ until its tension becomes equal to the drag of the friction of the brake-rubber of the spring $c^4$ and the surface $i'$ of the wheel, when the spring will have gathered sufficient resilient force to return the wheel to the zero position.

The recess in each of the integer type-wheels, to hold the spring which acts both as a brake-rubber and retractor, is provided with a cap, $c$, tightly fitted and secured by screws to the side of the wheel. A hub projects from the outside of the cap, on the exterior of which a seat, $b$, is turned to fit the eye of the ratchet, which, being placed on this seat, is secured by screws, Fig. 4, to the outside of the cap. This friction-brake rubber and retractor-spring, being tightly inclosed within a recess in the wheel, is protected from dust, flock, and other floating and falling obstructions that lodge upon and impede such mechanism when unprotected, which obstacles have to be overcome by stronger springs, that increase the wear and destroy the nice susceptibility to the action of slight forces, so necessary to accuracy and regularity of measurement of the finer kinds of cloth.

When the driving-pawls $c^9$ $c^{10}$ and the retaining-pawls $c^{11}$ are lifted clear of the teeth of the ratchets $c^7$ $c^8$, the springs $c^4$, by friction on the surfaces $i$, cause their respective type-wheels to revolve in a direction the reverse of that in which they are driven by their pawls $c^9$ $c^{10}$. Upon the side of each wheel $c'$ $c^2$ is a small pin or projection, $c^5$, Figs. 4, 18, 19, and upon the bracket $c^{40}$ there are corresponding hinged catches, $c^6$, with retaining-springs, Fig. 18, to press them inward. In the regular forward movement of the wheels $c'$ $c^2$ the pins $c^5$ strike the catches $c^6$ at every revolution, turn them aside, and pass them; but when the wheels $c'$ $c^2$ are returning to their zero position, under the action of their retractor-springs, the pins $c^5$ are arrested by the catches $c^6$, which abut against shoulders $i$, Figs. 3, 18, on the bracket $c^{40}$, causing the wheels to stop at the proper position for commencing the numbering anew. It is also a function of the friction rubber and retractor springs $c^4$, in addition to gathering, storing, and giving out tensile force, to steady the respective type-wheels against their retaining-pawls $c^{11}$, and thus prevent accidental misplacement of the impression.

The driving-pawls $c^9$ $c^{10}$ are moved to and fro by a lever, $c^{14}$, Figs. 2, 3, 5, actuated by a sinuous ring-groove cam, $c^{18}$, Figs. 3, 8, which does not revolve, but in which the end of the lever bearing a friction-roll, $c^{17}$, is carried round by the revolution of the disk C and bracket $c^{40}$, upon which the lever $c^{14}$ is mounted on a rock-shaft, $c^{16}$, Figs. 2, 3, 5.

The cam $c^{18}$ is supported by a tubular hub or sleeve, $c^{52}$, fitted into a tubular bracket, $c^{24}$, Fig. 3, in such a manner that it may not revolve, but may slide endwise, being governed by a guide-slot, $o$, in the bracket $c^{24}$, parallel to the axis of the sleeve, and a cam-pin, $c^{23}$, Figs. 3, 21, passing through the guide-slot $o$ and the slot $n$ in the collar $c^{27}$. The outward movement of the cam $c^{18}$ is limited by a stop-collar, $c^{45}$, secured firmly to the outer end of the hub $h$ of the disk C, and its inward movement is limited by the face of the disk C, against which it is borne, as shown in Fig. 3. A cap-collar, $c^{42}$, is fitted to slide upon the shaft S at the end of the hub $h$, its outer side having a rabbet on its outer corner to form a seat for the spring $c^{25}$, and its inner side having a flange extending over and beyond the inner side of the stop-collar a short distance, (best seen at $a$, Fig. 21,) and to within about the same distance from the outer end of the sleeve $c^{52}$, as seen at $c$. At a distance outside of the collar $c^{42}$ a collar, $c^{49}$, is firmly fixed upon the shaft S. This collar has a rabbet on its outer face to form a seat for the outer side of the spring $c^{25}$—the counterpart of the rabbet on the outer face of the cap-collar $c^{42}$. The spring $c^{25}$ is annular in form and bent in two opposite curves, as seen in Fig. 22, and is made of sheet cast-steel properly tempered. As shown in Fig. 21, the spring is bent inward, having forced the collar $c^{42}$ before it and closed the clutch and placed the cam $c^{18}$ in the printing position. When the cam is moved out again to permit the fraction and the integer types to recover their zero position, the hub $c^{52}$ is first moved toward the collar $c^{42}$, closing the gap $e$ and relaxing the frictional contact of the clutch-surfaces; second, the hub $c^{52}$, continuing outward, drives before it the collar $c^{42}$ until the gap $a$ is closed and the pressure of the spring lifted from the clutch and leaving the disk free to be retracted by the spring $c^{20}$ to its zero position; third, the hub now bearing against the fixed collar $c^{45}$, its further outward movement carries it, together with the collar $c^{42}$, on outward and flattening and compressing the spring $c^{25}$, until the collars $c^{42}$ and $c^{19}$ meet, when the spring will be under full tension and ready to reclose the clutch, return the cam $c^{18}$ to its inner position against the face of the disk, and reset the other parts in the positions shown in Figs. 3, 21.

When the cam $c^{18}$ is made to slide back, its action causes the lever $c^{14}$ to move beyond its regular working distance and throw the shoulder of the driving-pawl $c^{9}$ against a lug, $c^{11}$, Figs. 3, 5, projecting from the bracket $c^{10}$. This trips the pawls $c^{9}$ $c^{10}$ clear of the ratchets. At the same time the lever $c^{14}$, bearing with its adjustable trip-pin $c^{15}$ against the arm $i^{2}$, Figs. 3, 5, of the retaining-pawls $c^{11}$, lifts the latter from the ratchets and permits the retractor-springs $c^{4}$ to return their wheels $c'$ $c^{2}$, by a gentle movement, not averaging more than half a revolution to each wheel, to their initial or zero position. The cam $c^{18}$ contains in a suitable recess a friction spring-rubber, $c^{19}$, Fig. 8, faced with brass, felt, or other material that would give the required adhesion. To the friction spring-rubber $c^{19}$ is attached the outer end of a coil-spring, $c^{20}$, the other end of which is attached by a stud, $c^{51}$, to the disk C. The action of this spring is such that, while the disk C revolves in the regular operation of measuring, the friction-spring $c^{19}$ gains and holds a tension upon the spring $c^{20}$, so that the instant the disk C, by the opening of its clutch, is released from the driving power the spring $c^{20}$ will return it to the proper position for placing the types ready to commence marking a new series of numbers, while a stop-notch, $c^{21}$, on the edge of the spring-box of the cam $c^{18}$, and an elastic or spring catch-pin, $c^{45}$, Fig. 3, prevent the disk from being retracted back of that point, but does not, since the catch-pin slips over the sloping side of the notch, obstruct the forward movement of the disk while counting. The pin $c^{43}$, which projects from the side of the spring $c^{33}$, when it strikes the notch $c^{21}$ to stop the disk at zero, yields transversely by buckling the spring, and opposes a gradual but rapidly increasing resistance until the motion of the disk is arrested without injurious shock.

When the cam $c^{18}$ is returned to its working position the carrier or disk C is pressed back and the clutch-surfaces $c^{22}$ $c^{18}$ caused to re-engage by the action of a spring, $c^{25}$, which throws the clutch-surfaces into firm contact and holds them so until again freed by the disengaging movement of the cam $c^{18}$, as described. The cam has upon its hub $c^{52}$ a pin or projection, $c^{23}$, which, passing through a slot, $o$, parallel to the shaft S in the sleeve $c^{52}$ in bracket $c^{24}$, Fig. 3, permits the cam to slide, but prevents it from revolving. The outer end of the pin $c^{23}$ passes through a slot, $n$, Figs. 3, 20, in the cam-collar $c^{27}$, which is upon the sleeve-bracket and free to turn thereon, which slot lies spirally across the center line of the cam $c^{18}$. When the cam-collar $c^{27}$ is turned, the spiral slot acts as a screw-cam, driving the pin $c^{23}$, and with it the cam $c^{18}$, to and fro in the sleeve-bracket $c^{24}$.

A hand-lever, $c^{29}$, Figs. 1, 2, 3, is provided in a convenient position, which has a spring-latch, $c^{30}$, Figs. 2, 3, 13, to engage with a keeper, $c^{38}$, secured to the frame T, for holding it in position, and a rod, $c^{28}$, to connect it to the lug $c^{53}$, Figs. 2, 20, of the collar $c^{27}$, by which means the collar $c^{27}$ can be turned to bear with its oblique slot $n$ against and to slide the pin $c^{23}$, projecting from the hub $c^{52}$, and with it the cam $c^{18}$, which can be thrown forward or backward as the handle $c^{29}$ is turned up or down, and can be held in either position, as described, by the latch $c^{30}$ and keeper $c^{38}$.

During the act of printing or registering the fabric is supported and held against the face of the type by an impression roll or platen, $c^{31}$, Figs. 2, 3. This impression-roll may have a face clothed with vulcanized india-rubber, felt, or other suitable yielding material.

An inking mechanism is provided having an ink-fountain and inking-rolls N, Fig. 1, for supplying ink to the types as they pass. These inking-rolls N should be so situated with reference to the disk C that the regular change of position of the type-wheels $c'$ $c^{2}$, in the process of measuring, should be made not only after printing upon the cloth, but also before the contact of the type-wheels $c'$ $c^{2}$ with the rolls for inking them. During the time when the type-wheels $c'$ $c^{2}$ are in contact with the inking-rolls, or the cloth under the impression-roll $c^{31}$, the cam movement of the pawls $c^{9}$ $c^{10}$ should be returning them to their position for engaging with the succeeding ratchet-teeth to make the next forward motion, and therefore at that time the ratchets $c^{7}$ $c^{8}$ would be inactive, resting against the retaining-pawls $c^{11}$, and the types either taking ink or printing.

When it would be objectionable for any reason to mark the figures on the cloth, its length may be ascertained by looking at the measurements indicated by the types without printing, in which case the inking apparatus would be dispensed with and the impression-roll raised to keep it out of action.

The devices shown and not claimed in this application, so far as they are shown in the application of Peter H. Watson, No. 102,332, are herein and hereby disclaimed as of our joint invention.

In machines for measuring textile fabrics, registering symbols of the measure thereon, and indicating the measurement thereof, what we claim is—

1. A series of independent integer type-wheels, each having its own driving-pawl and ratchet, a retaining-pawl, a retractor-spring, and a zero-pawl and stop, in combination with a fraction type-carrier provided with a clutch, type-holders, and types, and a retractor spring to return the carrier to the zero position when the clutch is disconnected, substantially as described.

2. A series of integer type-wheels, each turning freely on a shaft in common, $c^3$, and each provided with a friction-surface, $i'$, in combination with a spring, $c^4$, for each wheel, acting both as a brake and retractor, and by sliding friction rubbing against and steadying the wheel while counting, and gathering and storing tensile force to be given out again through frictional contact with the wheel in returning it to the zero position after the counting is finished, substantially as described.

3. The combination of a series of integer type-wheels provided with ratchets, driving-pawls, retaining-pawls, a cam-lever, $c^{14}$, a cam, $c^{18}$, and tripping-lug $c^{11}$ with a return-spring, $c^4$, and pivoted stops $c^6$, whereby the integer-wheels are automatically returned to the zero position, substantially as described.

4. The friction-clutch consisting of the parts $c^{22}$ $c^{48}$, the fraction type-disk C, carrying the integer type-wheels, and their connecting and actuating mechanism, in combination with a lever, $c^{29}$, cam $n$, and sliding pin $c^{23}$, by means of which the types are held either in or out of action, substantially as described.

5. The combination of the friction-clutch, consisting of parts $c^{22}$ $c^{18}$ and fraction type-disk C, with the spring $c^{25}$ and collar $c^{45}$, cam $c^{18}$, pin $c^{23}$, cam-collar $c^{27}$, and bracket $c^{24}$, by means of which both the fractions-disk and the integer type-wheels are brought into the proper working position and held in connection with the driving power, substantially as described.

6. The combination of the type-disk C, having a yielding or elastic cushion-stop, $c^{49}$, with the cam $c^{18}$, return-spring $c^{20}$, and notch $c^{21}$, substantially as described.

7. The combination of the shaft S, sliding hub $h$, collar $c^{19}$, fixed on the shaft, and the collar $c^{45}$ fixed on the hub, with the spring $c^{25}$, the collar $c^{42}$, sliding on the shaft, the sleeve $c^{52}$, sliding in the tubular bracket $c^{24}$, and pin $c^{23}$ and the cam-collar $c^{27}$, whereby the spring $c^{25}$ may be compressed, the cam loosened, and the disk returned by the spring $c^{20}$ to its zero position before the sleeve $c^{52}$ bears against the collar $c^{45}$ and pushes the cam $c^{18}$ outward to trip the pawls, and then permit the retractor-springs $c^4$ to return the type to the zero position, substantially as described.

8. The combination of the tubular bracket $c^{24}$ and the tubular sleeve $c^{52}$, fitted into it, with the hub $h$, the cam $c^{18}$, and disk $c$, whereby the cam $c^{18}$ is firmly supported and free to slide inward and outward, and the disk C left to move back and forth to attach and detach the clutch and to turn unobstructed back to the zero position, substantially as described.

ANDREW H. SUTTON.
P. H. WATSON.

Witnesses:
ALOHA VIVARTTAS,
R. W. WATSON.